United States Patent
Yen

(10) Patent No.: US 6,381,694 B1
(45) Date of Patent: Apr. 30, 2002

(54) SYSTEM FOR AUTOMATIC RECOVERY FROM SOFTWARE PROBLEMS THAT CAUSE COMPUTER FAILURE

(75) Inventor: John Yen, El Granada, CA (US)

(73) Assignee: Apple Computer, Inc., Cupertino, CA (US)

(*) Notice: Subject to any disclaimer, the term of this patent is extended or adjusted under 35 U.S.C. 154(b) by 0 days.

(21) Appl. No.: 08/198,343

(22) Filed: Feb. 18, 1994

(51) Int. Cl.[7] .................................................. H04L 9/00
(52) U.S. Cl. .............................. 713/2; 713/1; 713/100; 714/3; 714/36
(58) Field of Search ........................ 395/700; 364/200; 380/4

(56) References Cited

U.S. PATENT DOCUMENTS

| | | | | |
|---|---|---|---|---|
| 4,070,704 A | * | 1/1978 | Calle et al. ................. | 364/200 |
| 4,491,914 A | * | 1/1985 | Sujaku ........................ | 364/200 |
| 4,654,852 A | * | 3/1987 | Bentley et al. ............... | 371/29 |
| 4,847,749 A | * | 7/1989 | Collins et al. .............. | 364/200 |
| 5,068,780 A | * | 11/1991 | Bruckert et al. ............ | 395/700 |
| 5,128,995 A | * | 7/1992 | Arnold et al. ............... | 380/4 |
| 5,134,580 A | * | 7/1992 | Bertram et al. ............. | 395/650 |
| 5,269,022 A | * | 12/1993 | Shinjo et al. ............... | 395/700 |
| 5,390,324 A | * | 2/1995 | Burckhartt et al. ......... | 395/575 |

OTHER PUBLICATIONS

Wong, William, et al, "The MS–DOS Encyclopedia", 1988, Microsoft Press, pp. 69–70.

IBM Technical Disclosure Bulletin, "Method to Recover From Failed Boot Drive Using Diskettes", vol. 36, No. 10, Oct. 1993, pp. 329–330.

IBM Technical Disclosure Bulletin, "Logical IPL Selection Mechanism", vol. 29, No. 2, Jul. 1986, pp. 49–493.

* cited by examiner

Primary Examiner—Majid A. Banankhah
(74) Attorney, Agent, or Firm—Burns, Doane, Swecker & Mathis, L.L.P.

(57) ABSTRACT

A system for recovering from certain types of system software startup problems employs a user-hidden secondary startup volume stored in the computer. During a normal startup procedure, if an error is detected which would normally result in a startup failure, the computer's startup routine branches to an alternate startup application stored in the secondary volume. This startup application boots the computer from a minimal operating system stored in the secondary volume. As a result, the user is not left with a non-functioning computer. As further features of the invention, the startup application can attempt to automatically fix the detected problem, or it can suggest possible steps to be taken by the user, in order to fix the problem that resulted in the need to use the alternate startup application.

28 Claims, 8 Drawing Sheets

SYSTEM FOR AUTOMATIC RECOVERY FROM SOFTWARE PROBLEMS THAT CAUSE COMPUTER FAILURE

FIELD OF THE INVENTION

The present invention is directed to detection and recovery from problems that cause operational failures in computers, and in one particular embodiment to a system that permits a computer to boot despite the presence of a software problem that could otherwise cause a startup failure.

BACKGROUND OF THE INVENTION

When a computer is first started, it proceeds through certain startup stages which check for particular types of errors. If no errors are detected, the computer loads an operating system into its main memory and carries out other tasks associated with initial startup. If, however, an error is detected during the startup stages, further procedures are interrupted and the computer may display a warning to the user, to provide an indication of the detected error For example, if an operating system file is not stored at an expected location, the computer may display the message "Unable To Find System Folder."

For sophisticated computer users, the steps necessary to correct for many types of errors that cause startup failures may be readily apparent. For example, if the system folder cannot be located, an experienced user may realize that an emergency disk containing the system folder needs to be located and inserted in a disk drive, or a file needs to be moved from one location to another. A novice user, however, may not understand the error message, and therefore not know how to recover from the error condition. In either case, the user is faced with a computer that doesn't work, and may spend a significant amount of time and effort attempting to overcome the problem that caused the failure.

In the past, some efforts have been made to overcome certain types of errors that interfere with proper operation of the computer. For example, some computers are constructed with hardware fault-tolerant systems. In these types of systems, certain faults which might otherwise cause a failure can be overcome or circumvented. While this approach has utility in certain circumstances, it is not generally applicable to all types of computers. Rather, the fault tolerance must be specifically designed for each different type of computer. In addition, this approach does not offer the capability to correct software-related problems, which are the more common source of operational failures in general purpose computers.

Other approaches to this problem have employed software stored within the computer system that attempts to identify and fix certain types of file system errors.

Some of these approaches are user-invoked, rather than being automatic, and therefore not likely to be used by novice users. In addition, they are specific to the particular system on which they are stored, rather than being generally applicable to all types of computers.

Accordingly, it is desirable to provide a system for recovering from software errors that has general applicability to any type of computer system and requires only minimal system resources.

BRIEF STATEMENT OF THE INVENTION

In accordance with the present invention, the foregoing objective is achieved by means of a user-hidden secondary volume or partition in the computer permanent storage mechanism, e.g., hard disk. If an error is detected which would normally result in an operational failure, the computer branches to recovery software stored in the secondary volume. For example, in the case of startup errors, the recovery software can include an alternate startup application which enables the computer to be booted. In one embodiment, the startup application installs a minimal operating system on the primary volume and then restarts the computer. Due to the presence of the minimal operating system installed in the primary volume, the computer is able to start. As a result, the user is not left with a non-functioning computer.

As further features of the invention, the recovery software can attempt to automatically fix the detected problem, or it can suggest possible steps to be taken by the user, in order to fix the problem that resulted in the initial failure.

Since the error detection and recovery system of the present invention is software-based, and does not rely upon specialized hardware, it has general applicability to any type of computer system. Furthermore, it requires only the use of minimal system resources to operate. It provides the user with an automatic recovery from software problems, rather than simply detecting a startup problem and informing the user. Thus, the user does not need to have any familiarity with the operation of a computer in order to overcome problems, and does not have to pursue manual procedures to fix a problem in order to make the computer operate.

Further features and advantages of the invention are explained hereinafter with reference to preferred embodiments illustrated in the accompanying drawings.

DETAILED DESCRIPTION

In order to facilitate an understanding of the principles and features of the present invention, it is described hereinafter with reference to its implementation in a personal computer. In certain instances, specific reference is made to features of a Macintosh brand computer, supplied by Apple Computer, Inc., for ease of understanding. It will be appreciated, however, that the applicability of the invention is not limited to this particular embodiment. Rather, the invention can find utility in any type of general purpose computer in which it is desirable to overcome software-related problems.

Figure 1:
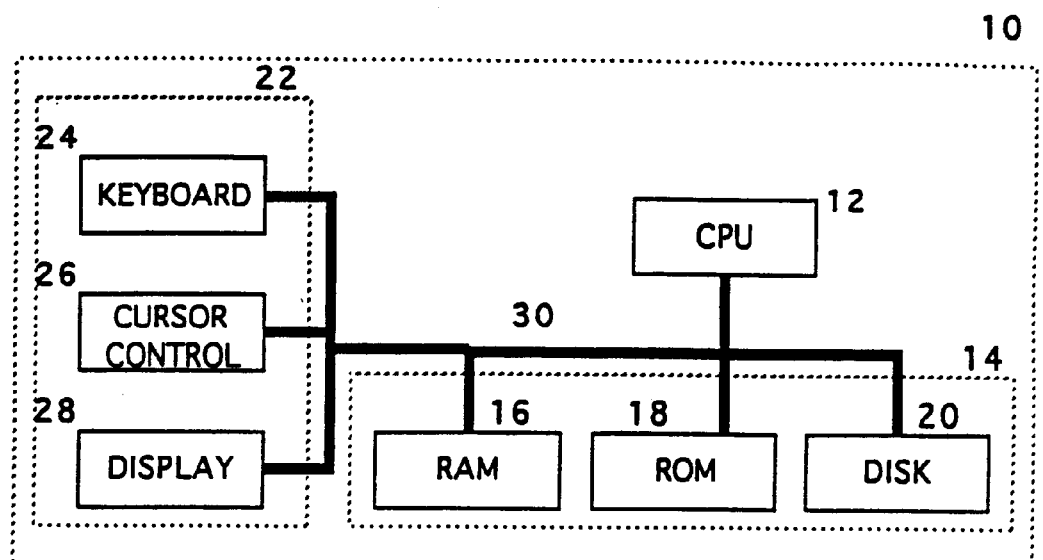
FIG. 1 is a general block diagram of the major components of a computer system in which the present invention can be employed.

The primary components of a general purpose computer, in which the present invention can be implemented, are illustrated in block diagram form in FIG. 1. The structure of the computer itself does not form part of the present invention. It is briefly described here for subsequent understanding of the manner in which the features of the invention cooperate with the structure of the computer.

The three main components of a general purpose computer comprise a processor, a user interface for data entry and output, and a data storage or transfer device. Referring to FIG. 1, the computer 10 includes a central processing unit 12. Additional processors can also be included in the computer. The data storage device 14 includes a main memory which is typically implemented in the form of a random access memory 16. The data storage can also include a static memory such as a read only memory 18, and other permanent storage, such as a magnetic or optical disk 20. The data entry portion of the user interface 22 can be a keyboard 24 and/or a pointing or cursor control device 26 such as a mouse, trackball, pen or the like. The data output portion typically includes a display device 28, such as a CRT monitor or an LCD screen. The CPU 14 communicates with each of these devices through a bus 30.

A computer of the general type illustrated in FIG. 1 can be embodied in several different forms, including a mainframe computer, a network terminal, a personal computer, and a palmtop computer, or personal digital assistant (PDA).

When the computer is first started, it runs a startup routine that is stored on its internal ROM 18. As part of this startup routine, the computer proceeds through various stages to determine its configuration, e.g., the number and addresses of the various disk drives, and whether its hardware components are properly functioning. For example, it may check the status of communications with the various input and output devices, such as the keyboard 24 and the cursor control device 26. In addition, it can perform a check of the RAM 16 to be sure it is properly accessible.

If no errors were detected in the hardware, the startup procedure then loads an operating system into the RAM 16. Typically, at least part of the operating system is stored in permanent storage, such as the ROM 18 and/or the disk 20. The permanent storage may be divided into a number of volumes or partitions. The startup routine expects to find required parts of the operating system in a particular volume, referred to herein as the main or primary volume. If the necessary operating system components are found in the main volume, the integrity of certain system files are checked. If no corruption is found in these files, the operating system is loaded into the RAM 16, and the CPU 14 then operates in accordance with the instructions provided by the operating system.

If, however, the operating system file cannot be located in the main volume, or if certain files are found to be corrupted, a startup failure occurs. In the past, when this situation occurred, an error message was presented on the display, to inform the user that startup could not be completed due to a detected problem. If the user was sufficiently familiar with the operation of the computer to correct the problem, appropriate actions could be carried out. For example, a startup disk which contained the proper operating system files could be inserted in a disk drive, and the system restarted. If corrupted files were found during the initial startup procedure, utility software could be employed to attempt to repair the files. However, these procedures required the user's input and time to carry out the appropriate actions. Furthermore, a novice user, particularly one who had just purchased the computer, is not likely to understand the nature of the detected problem, and therefore how to correct it.

To overcome these difficulties, in accordance with the present invention an alternate startup application is stored on a secondary or recovery volume of the disk or other permanent storage. If certain types of problems which prevent a normal startup are detected, the alternate startup application in the recovery volume is employed to boot the computer. For example, the startup application can install a minimal bootable system on the primary volume, and then restarts the computer with this minimal system. In the context of a Macintosh computer, for example, the minimal bootable system can comprise a system folder, a user interface application, such as the Finder, and one or more system enablers, e.g., system.init files. Due to the presence of the minimal bootable system in the main volume, the computer is able to start. As a result, the user is not faced with a non-functioning computer.

Alternatively, the startup application can directly boot the computer from the minimal system in the recovery volume, and thereby avoid the need to force a restart of the computer.

The recovery software is located in a separate area of permanent storage, rather than the main area, to ensure its reliability. In the context of the present invention, that separate area could be a distinct partition on a disk, or it could be a separate volume, i.e. file system, on a partition that contains other volumes. Further in this regard, the secondary volume or partition need not be located on the same storage device as the main volume from which the system software is normally loaded. It could be located on a different device, such as flash memory or a network server. The only requirement is that the secondary volume be accessible during the startup process before the main volume is read.

The use of a separate volume for storing the recovery software is based upon certain features which ensure its reliability. Because it is separate, the recovery volume is rarely, if ever, written to during normal system operation, and therefore relatively safe from damage. In this regard, it is preferable that the recovery volume be hidden from the user, to further minimize the likelihood of inadvertent damage. When access does occur, it is either automatic or it takes place only in specified circumstances, e.g. a user response to a specific prompt. As such, all access to the recovery volume is under controlled conditions.

Figure 2:
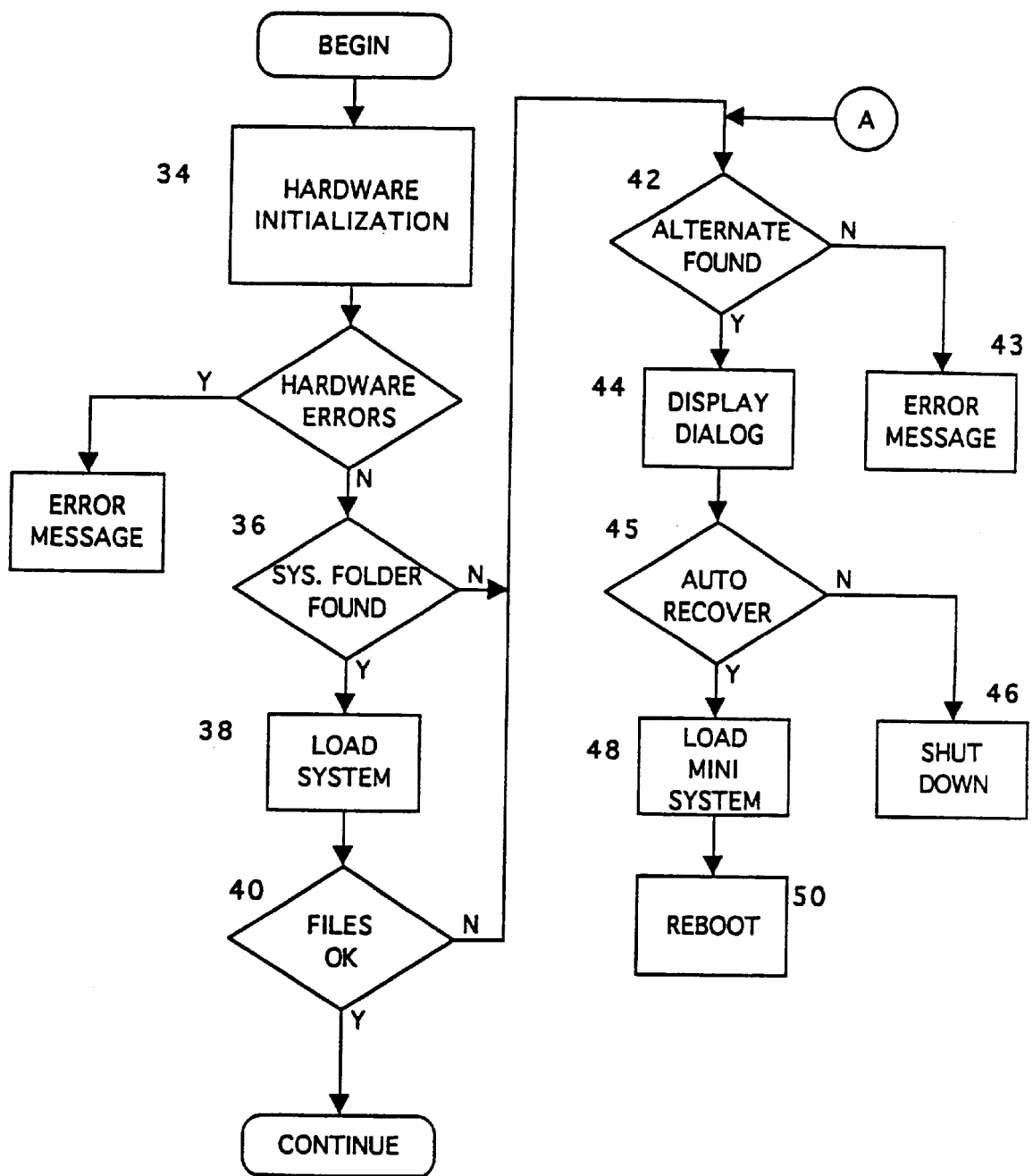
FIG. 2 is a flowchart of the general operation of a software-error recovery system in accordance with the present invention.

The overall operation of the recovery system of the present invention is explained in greater detail hereinafter with reference to one embodiment depicted in the flow chart of FIG. 2 and various user interface screens illustrated in FIGS. 3–7. More detailed features of the operation are then explained with reference to the flow charts of FIGS. 8 and 9. Referring to FIG. 2, when the computer system is first started, or booted up, it undergoes an initialization routine 34 to determine its configuration and detect hardware errors. If no errors are detected, the system proceeds to load the operating system into the main memory 16. As a first step in this process, the computer determines whether a system folder is located in the main volume of the disk (Step 36). If so, appropriate files from the folder are loaded into the main memory (Step 38), and checked to determine whether they are corrupt (Step 40). If the files are successfully loaded and found to have no corruptions, the computer continues with the remainder of the booting process, under the control of the operating system.

If the operating system cannot be located in the main volume, or if one of the system files is found to be corrupted, the computer proceeds to Step 42, to determine whether an alternate startup application is located in a secondary volume. If no alternate startup application is present, an error message 43 is displayed, in a manner similar to the operation of a conventional computer when system software errors are encountered.

Figure 3:
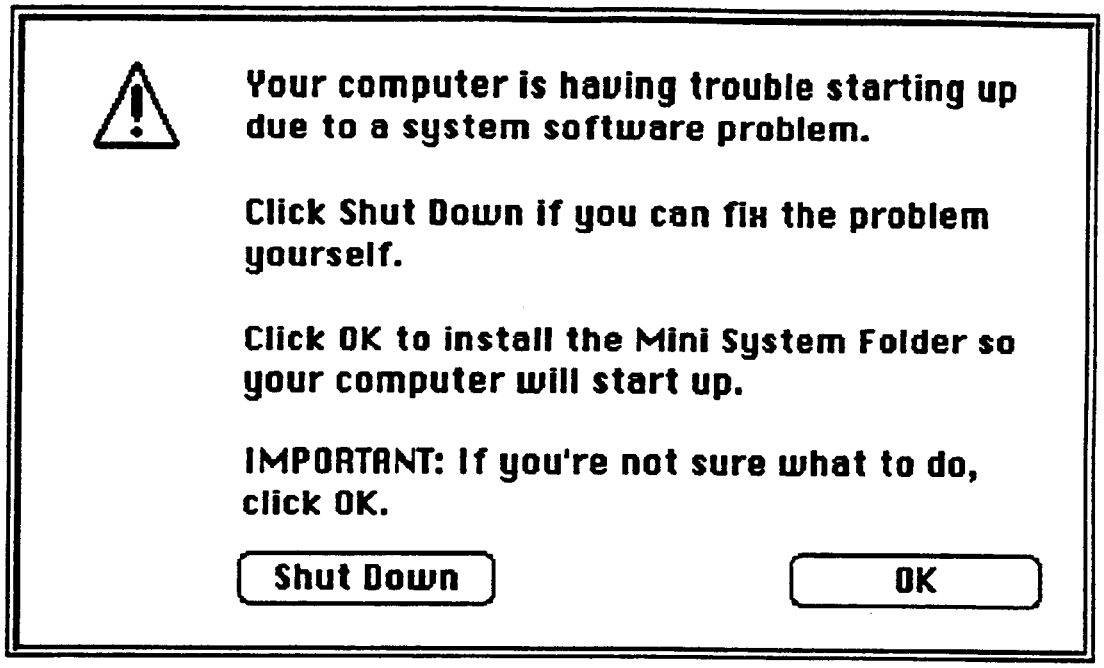
FIG. 3 is a diagram of a dialog screen display that appears when a software-error is detected.

If the alternate startup application is present in the secondary volume, a recovery application dialog box, as illustrated in FIG. 3, is displayed to the user (Step 44). This dialog informs the user that a system software problem was encountered during the startup procedure, and provides the user with two options for proceeding. If the user is capable of fixing the problem, he can choose to shut down the computer, at Step 45, and carry out the necessary recovery steps. In response to selection of this option, the computer automatically shuts down at Step 46, to enable the user to carry out the appropriate procedures. If, however, the user is not sufficiently familiar with the operation of the computer to undertake such an endeavor, or simply chooses not to do so, he can allow the alternate startup application to boot the computer from a minimal system, and thereby overcome the detected problem.

If the user decides to allow the alternate startup application to proceed, the computer loads the minimum bootable system into the main volume of the disk at Step 48. For example, the contents of the recovery volume, except the startup application, can be copied to the main volume. The startup application then reboots the computer at Step 50. With the minimal system installed on the main volume, the problem detected at Step 36 or Step 40 is no longer present, and the computer is able to complete the boot-up process. Preferably, the software which is represented by the flow chart of FIG. 2 is present as program code in the hard disk driver that is run during startup.

Alternatively, instead of copying the minimal system to the main volume and forcing a restart of the computer at Step 50, the startup application can proceed to directly boot the computer from the system in the recovery volume. In this case, the operation of the startup application can be made totally transparent to the user.

Figure 4:
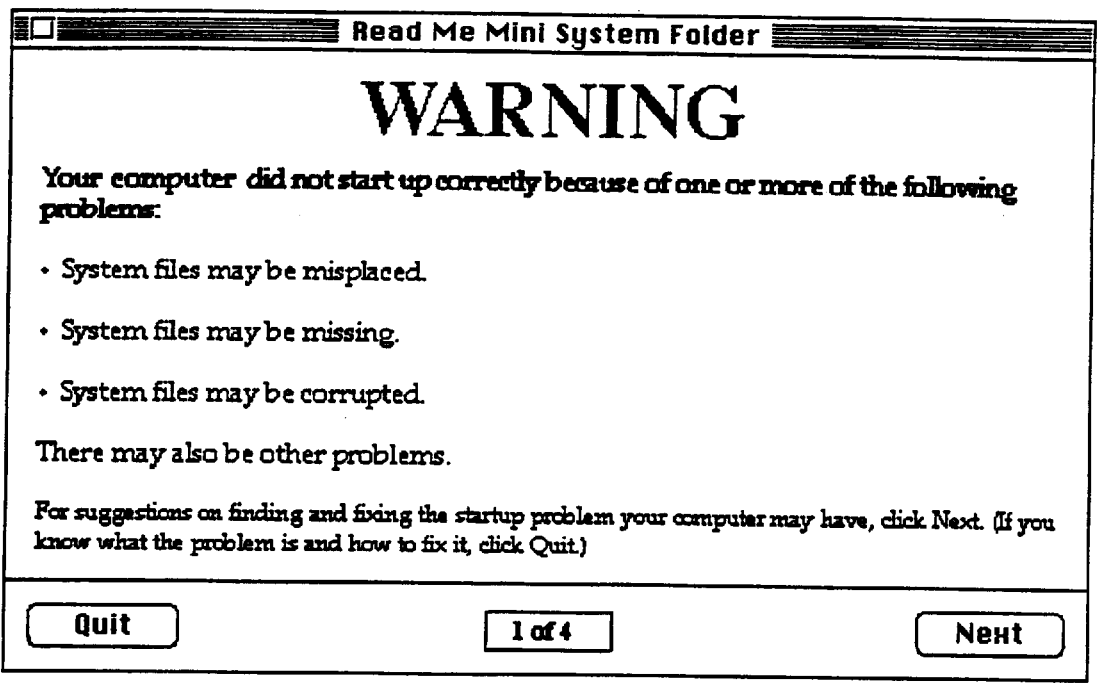
FIGS. 4–7 are diagrams of screen displays that appear when the user has chosen to boot the computer with the alternate startup application.
Figure 5:
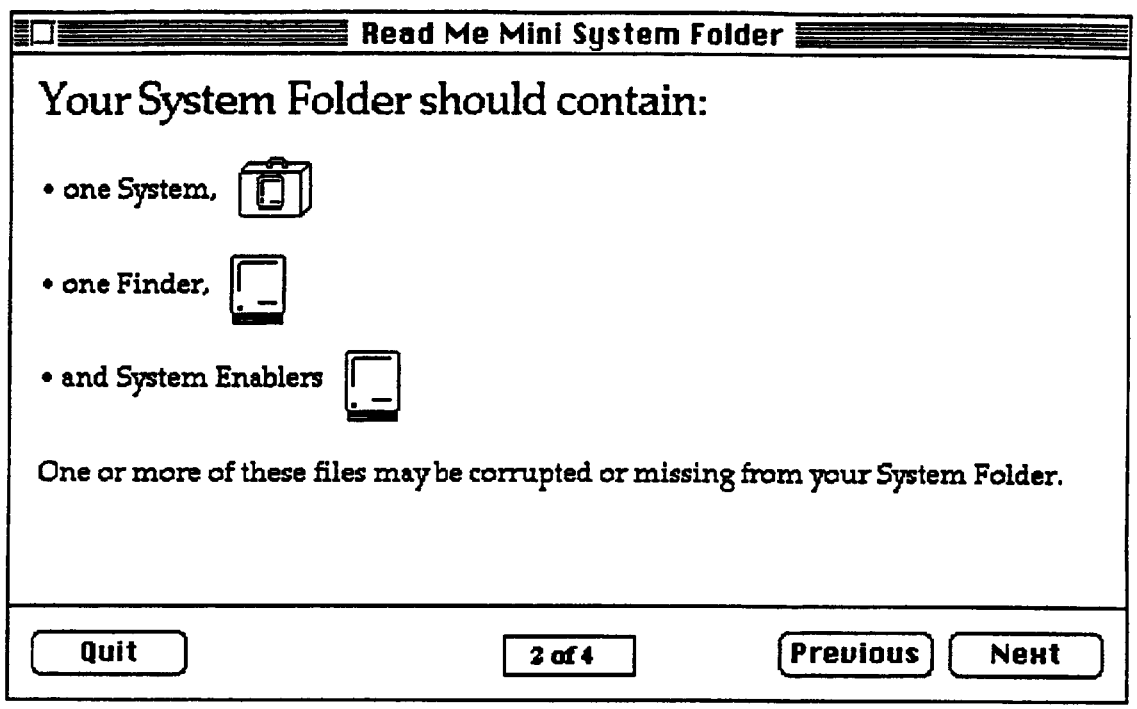
Figure 6:
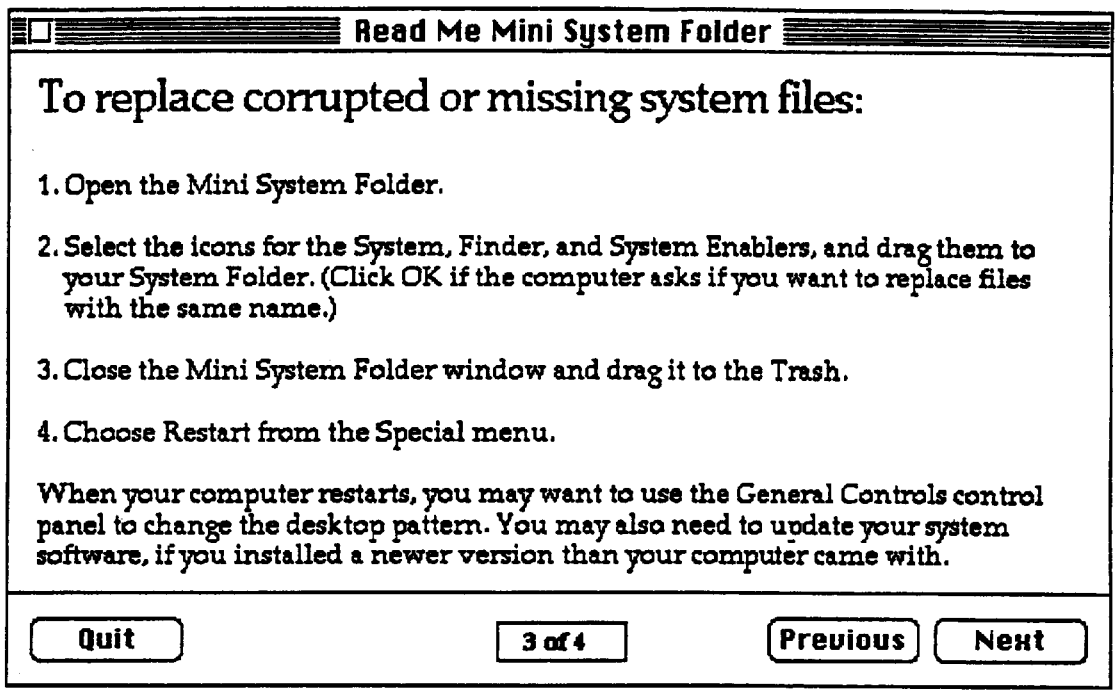
Figure 7:
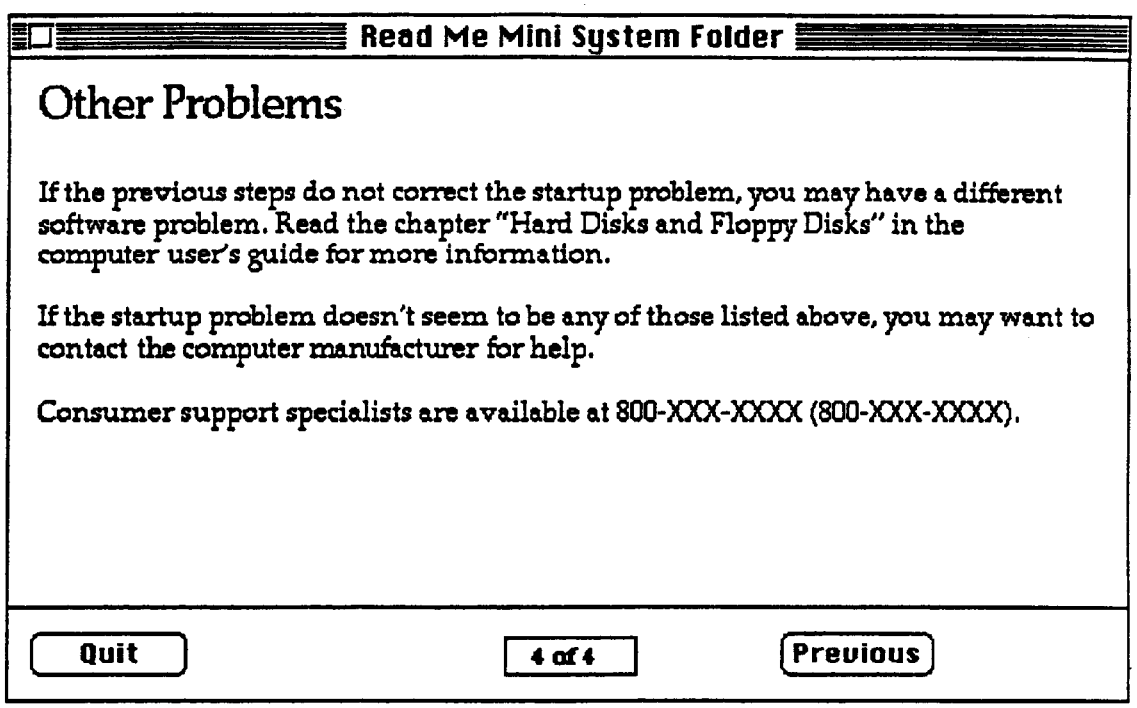

When the booting process is completed with the use of the alternate system, an appropriate form of notification can be provided to the user, For example, a different desktop display might be presented, to indicate that something other than the normal system is being used. Alternatively, or in addition, the user can be presented one or more informational screens which provide guidance on fixing the problem that was initially encountered. An example of suitable informational screens is illustrated in FIGS. 4–7. Referring to FIG. 4, the initial informational screen can identify possible reasons for the problem encountered during startup. Subsequent screens, such as those shown in FIGS. 5–7, can guide the user through appropriate steps for attempting to correct the problem.

In some situations, the failure to properly boot the computer may not be due to an operating system error. For example, power to the computer might be interrupted during the startup procedure, prior to the time that the operating system is loaded into the main memory. This power interruption may result in an error indication. However, in this situation it is not necessary that the recovery mechanism be accessed as a result of the error. Therefore, rather than invoking the recovery mechanism after any incomplete boot, it is preferable to allow one incomplete boot without a detected error, and then invoke the recovery mechanism if there is another such incomplete boot.

Figure 8:
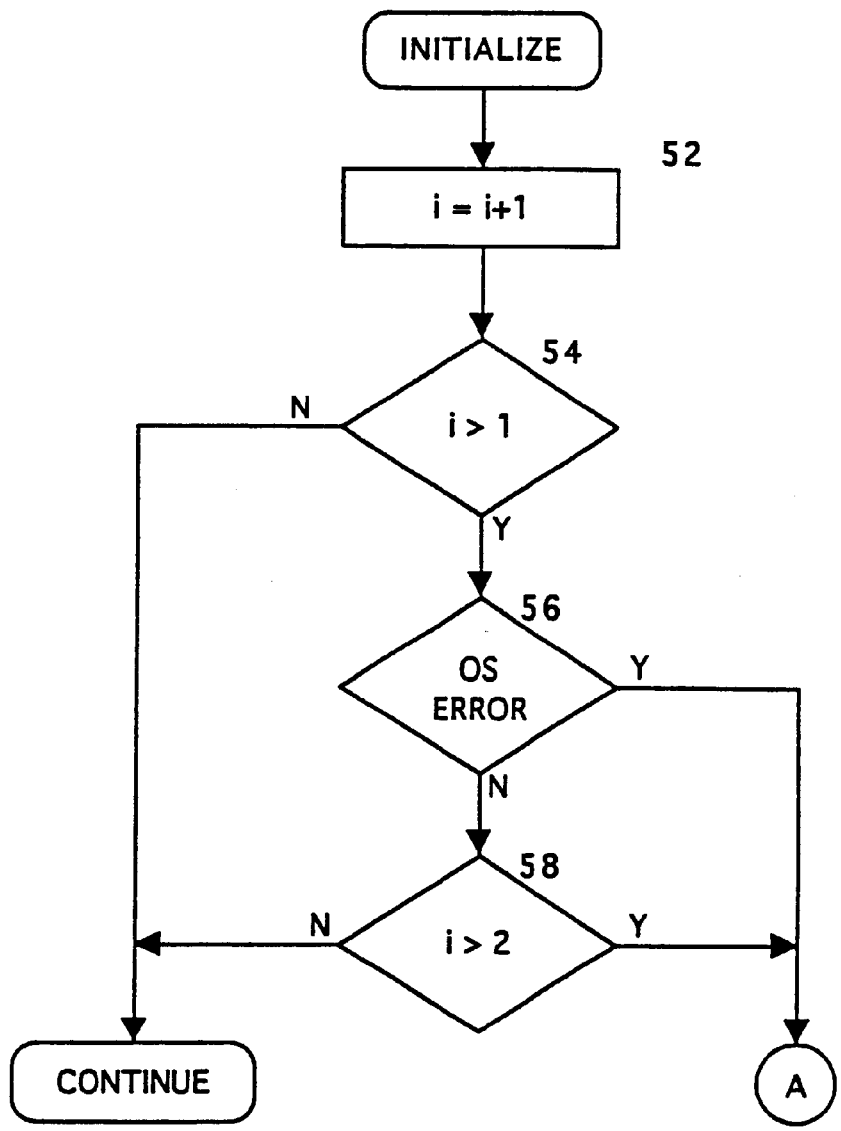
FIG. 8 is a flowchart of an alternate procedure for invoking the recovery system.

A flowchart which depicts the operation of the system in accordance with this preferred embodiment is illustrated in FIG. 8. Referring thereto, during initialization (Step 34 of FIG. 2), an index or counter, i, can be incremented to indicate that a boot process has been initiated (Step 52). If the computer is successfully started, this index can be reset to zero. If, however, the booting of the computer is interrupted, the counter will remain at a value greater than zero. At Step 54, the computer determines whether the value of the index is greater than one. If so, at least one incomplete boot has previously occurred. At this point, the computer determines, at Step 56, whether an operating system error was recorded during the previous incomplete boot. If so, the process proceeds to Step 42 of FIG. 2, to implement the recovery mechanism.

If no operating system error was recorded during the previous incomplete boot, the system determines whether the index has a value greater than two, at Step 58. If so, at least two incomplete boots have previously occurred. Therefore, the recovery mechanism is again invoked to enable the computer to be booted. Otherwise, the normal startup procedure continues.

In the embodiments of the invention depicted in the flowcharts of FIGS. 2 and 8, the recovery system of the present invention automatically boots the computer from the minimal operating system installed on the recovery volume, if the user chooses that approach. As a further feature, it is possible to have the recovery system first attempt to fix the problem that resulted in the boot failure, rather than automatically boot from the minimal system on the secondary volume. For example, a novice user may delete necessary system files, or move them to an area where they cannot be normally accessed during startup. This situation would result in a negative response at Step 36 of FIG. 2. Before booting from the alternate system in the recovery volume, it is possible to search the hard disks on the system to determine whether the necessary files are present. If they are found, they can be copied to the proper location on the disk, so that the normal booting process can continue.

An alternate type of fix might be to boot from a different disk, and notify the user. If such fixes can be implemented, it is not necessary to boot from the minimal operating system stored on the recovery volume.

In the operation depicted in the flowchart of FIG. 2, the automatic recovery procedure is invoked if files intended for use at startup are missing or corrupt. These are not the only situations in which the automatic recovery system can be employed. It can also be invoked when other types of file system problems are encountered, and when files are being run or loaded at startup which should not be, such as viruses or conflicting system software. In the case of a virus, for example, the recovery system can implement a correction by detecting and fixing or replacing damaged files.

Figure 9:
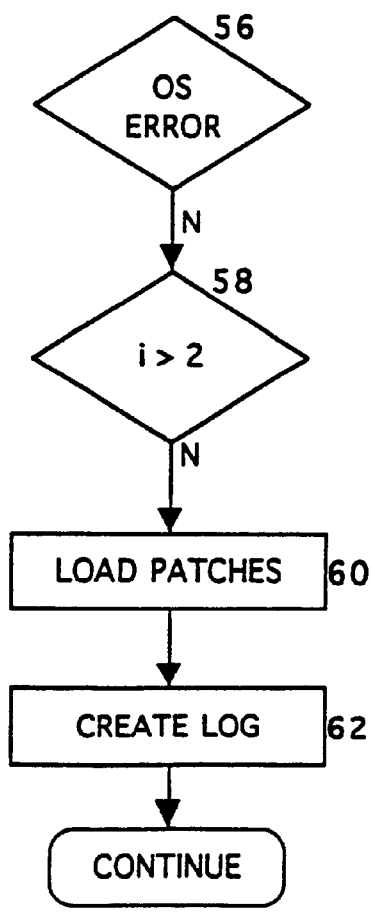
FIG. 9 is a flowchart of a procedure for monitoring startup to detect a reason for failure.

As a further feature, the recovery system can provide the user with various levels of information regarding the cause of the startup failure that caused the recovery system to be invoked. For example, in the procedure of FIG. 8, if no operating system error was recorded after one incomplete boot, i.e. a negative response at Step 56, the booting process can be monitored to identify the location in the process at which the failure occurred. Such a procedure is illustrated in the flowchart of FIG. 9. Referring thereto, if a negative response is received at Step 56, software patches are installed at Step 60, to monitor the next startup. The function of each patch is to monitor and record the completion of a startup procedure with which it is associated. Thus, as each procedure is completed, a log is generated which records the completed events (Step 62). The number of patches that are installed is determined by the amount of information that is desired to be obtained. For example, if only general information is needed, one patch could be installed for each major stage in the startup procedure. If more detailed information is desired, a patch can be installed for each step or task to be performed during the startup procedure.

If another startup failure occurs after the monitoring patches have been installed, the last recorded task or stage in the log provides an indication of the stage or task at which the failure occurred. When the computer is booted by means of the alternate startup application in the recovery volume, a flag can be set to indicate this fact. After a successful boot, the startup application can check the state of this flag and, if it is set, read the log to inform the user of the location in the startup procedure at which the failure occurred, and the possible reasons therefore.

From the foregoing, it can be seen that the present invention provides a fault recovery system that automatically enables a software problem to be overcome, and thereby avoid the frustration of a non-working computer and the hassles associated with fixing it. For more sophisticated users who may be readily aware of the procedures necessary to correct software types of problems, the recovery system provides them with the option to carry out the necessary corrections themselves, rather than use the automatic recovery procedures. The system has very little impact on the computer's resources, since it requires very little extra processing during normal operation. More particularly, if a working system folder is present in the main volume, and no startup errors are encountered, the additional drive access that is required during startup, as a result of the procedures carried out in accordance with the present invention, is anticipated to be on the order of one second or less.

In the foregoing specification and accompanying drawings, the present invention has been described with respect to one particular implementation. It will be appreciated, however, that it can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes which come within the meaning and range of equivalency of the claims are intended to be embraced therein.

What is claimed is:

1. In a computer, a system for recovering from software problems that interfere with proper startup of the computer, comprising:

a storage mechanism having at least a main storage area from which operating system software is normally retrieved and loaded into working memory during startup of the computer, and a secondary area storing at least those portions of said operating system software which are necessary to start the computer;

means for detecting a software problem that interferes with proper startup of the computer;

means for attempting to fix a detected software problem; and means responsive to the detection of said problem for loading the portions of the operating system stored in said secondary area into said main area when the problem is not fixed by said attempting means; and means for rebooting the computer after said portions of the operating system have been loaded into said main area, to thereby enable the computer to be started.

2. The system of claim 1 wherein said problem is the absence of operating system files in said main area of the storage mechanism.

3. The system of claim 1 wherein said problem is corruption of an operating system file stored in said main area of the storage mechanism.

4. The system of claim 1 wherein said problem is the detection of a file which should not be loaded during startup.

5. The system of claim 1 further including means for attempting to fix the problem before loading said portions of the operating system stored in said secondary area.

6. The system of claim 1 wherein said secondary area is normally hidden from user access.

7. The system of claim 1 further including means for indicating the problem to a user of the computer.

8. The system of claim 7 wherein said indicating means includes means for recording events that occur during a failed startup, and means for identifying an event which was not successfully completed during the failed startup.

9. A method for recovering from problems associated with software that prevent normal startup of a computer, comprising the steps of:

establishing a secondary area in a storage mechanism of the computer which is separate from a main area that is normally accessed to obtain operating system files during startup procedures, and storing in said secondary area at least those portions of said operating system which are necessary to start the computer;

detecting a software-related problem that prevents normal startup of the computer;

attempting to automatically fix a detected problem;

loading said portions of the operating system stored in said secondary area into said main area upon detection of said problem when said detected problem is not automatically fixed, and rebooting the computer to enable it to be started with the operating system loaded from the secondary area into the main area.

10. The method of claim 9 further including the step of providing a computer user with an option to shut down the computer instead of having the computer booted from the portions of the operating system stored in the secondary area.

11. The method of claim 9 wherein said secondary area is normally hidden from user access.

12. A method for recovering from problems associated with software that prevent normal startup of a computer, comprising the steps of:

establishing a secondary area in a storage mechanism of the computer which is separate from a main area that is normally accessed to obtain operating system files during startup procedures, and storing in said secondary area at least those portions of said operating system which are necessary to start the computer;

initiating a first startup of the computer;

detecting a first failure of the computer to start;

initiating a second startup of the computer;

monitoring tasks performed during said second startup of the computer;

detecting a second failure of the computer to start;

attempting to automatically fix a detected problem;

booting the computer from said portions of the operating system stored in the secondary area when said detected problem is not automatically fixed; and indicating a problem associated with a task that was not performed during the second startup.

13. The method of claim 9 wherein said problem is the absence of an operating system files in said main area of the storage mechanism.

14. The method of claim 9 wherein said problem is corruption of an operating system file stored in said main area of the storage mechanism.

15. The method of claim 9 wherein said problem is the detection of a file which should not be loaded during startup.

16. A method for recovering from problems associated with software that prevent normal operation of a computer, comprising the steps of:
    establishing a user-hidden secondary area in a storage mechanism of the computer which is separate from a main area that is normally accessed to obtain software files employed during operation of the computer, and storing in said secondary area at least those portions of software files which are necessary to perform a desired operation with the computer;
    detecting a software-related problem that prevents normal operation of the computer;
    attempting to automatically fix a detected problem;
    loading the portions of the software files stored in said secondary area into said main area when said detected problem is not automatically fixed; and
    operating the computer with the files loaded from the secondary area into the main area.

17. The method of claim 16 further including the step of providing a computer user with an option to shut down the computer instead of having said software files loaded into the main area.

18. The method of claim 16 wherein said problem is a failure of the computer to properly boot upon startup, and said software files stored in the secondary area comprise a minimum bootable operating system.

19. The method of claim 16 further including the step of attempting to fix the detected problem before operating the computer with said software files stored in the secondary area.

20. In a computer, a system for recovering from software problems that interfere with proper startup of the computer, comprising:
    a storage mechanism having at least a main storage area from which operating system software is normally retrieved and loaded into working memory during startup of the computer, and a secondary area storing at least those portions of said operating system software which are necessary to start the computer;
    means for detecting a software problem that interferes with proper startup of the computer;
    means responsive to the detection of said problem for loading the portions of the operating system stored in said secondary area into said main area; and
    means for rebooting the computer after said portions of the operating system have been loaded into said main area, to thereby enable the computer to be started.

21. The system of claim 20 wherein said problem is the absence of operating system files in said main area of the storage mechanism.

22. The system of claim 20 wherein said problem is corruption of an operating system file stored in said main area of the storage mechanism.

23. The system of claim 20 wherein said problem is the detection of a file which should not be loaded during startup.

24. The system of claim 20 wherein said secondary area is normally hidden from user access.

25. A method for recovering from a problem that prevents normal startup of a computer, comprising the steps of:
    establishing a secondary area in a storage mechanism of the computer which is separate from a main area that is normally accessed to obtain operating system files during startup procedures, and storing in said secondary area at least those portions of an operating system which are necessary to start the computer;
    determining whether software necessary to boot the computer is stored in said main area;
    attempting to locate said software if it is not stored in said main area;
    copying the software to said main area if it is located and booting the computer from said copied software; and
    booting the computer from said portions of the operating system stored in the secondary area if said software cannot be located.

26. The method of claim 25 wherein said secondary area is normally hidden from user access.

27. A method for recovering from problems associated with software that prevent normal operation of a computer, comprising the steps of:
    establishing a user-hidden secondary area in a storage mechanism of the computer which is separate from a main area that is normally accessed to obtain software files that are loaded into working memory for operation of the computer, and storing in said secondary area at least these portions of software files which are necessary to perform a desired operation with the computer;
    detecting a software-related problem that prevents normal operation of the computer;
    loading the portions of the software files stored in said secondary area into said main area upon detection of said problem; and
    operating the computer with the files loaded from the secondary area into the main area.

28. The method of claim 27 further including the step of providing a computer user with an option to shut down the computer instead of having said software files loaded into the main area.

* * * * *

UNITED STATES PATENT AND TRADEMARK OFFICE
CERTIFICATE OF CORRECTION

PATENT NO. : 6,381,694 B1
DATED : April 30, 2002
INVENTOR(S) : John Yen

It is certified that error appears in the above-identified patent and that said Letters Patent is hereby corrected as shown below:

Column 8,
Line 62, after "of", delete "an";

Column 10,
Line 35, after "least", delete "these", insert -- those --.

Signed and Sealed this

Twenty-fourth Day of December, 2002

JAMES E. ROGAN
*Director of the United States Patent and Trademark Office*

UNITED STATES PATENT AND TRADEMARK OFFICE
CERTIFICATE OF CORRECTION

PATENT NO. : 6,381,694 B1
DATED : April 30, 2002
INVENTOR(S) : John Yen

It is certified that error appears in the above-identified patent and that said Letters Patent is hereby corrected as shown below:

Column 8,
Line 3, after "claim", delete "1", insert -- 20 --;

Column 9,
Line 29, after "claim", delete "16", insert -- 27 --.

Signed and Sealed this

Twenty-ninth Day of April, 2003

JAMES E. ROGAN
*Director of the United States Patent and Trademark Office*